May 24, 1955 — D. NISSER — 2,709,115
NON-SKID DEVICE FOR AUTOMOBILES
Filed May 1, 1951
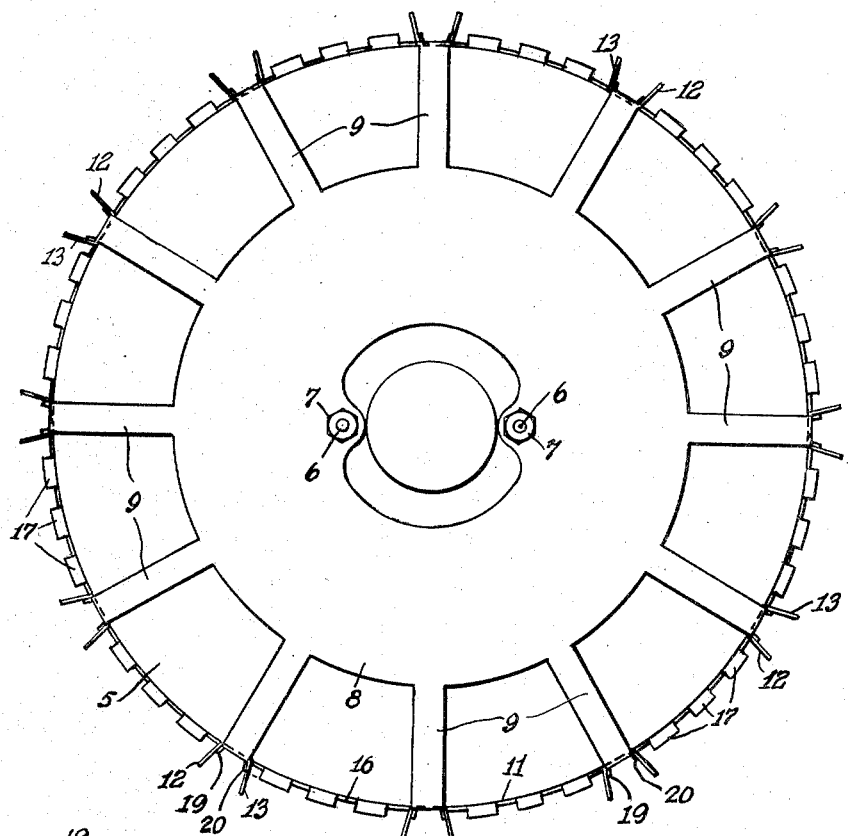
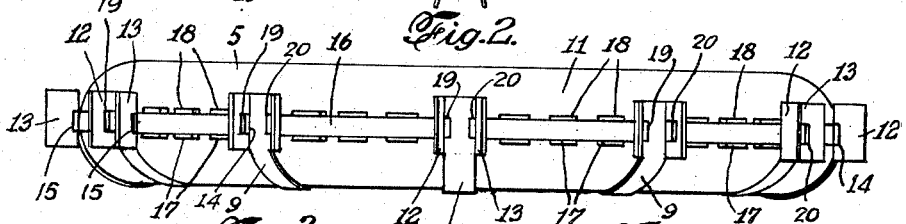
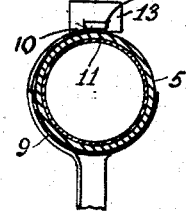 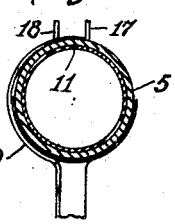
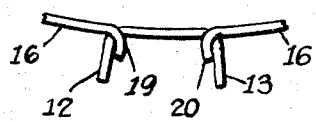
INVENTOR
DAN NISSER
BY
ATTORNEY United States Patent Office 2,709,115
Patented May 24, 1955

2,709,115

NON-SKID DEVICE FOR AUTOMOBILES

Dan Nisser, Wright, Minn.

Application May 1, 1951, Serial No. 224,038

1 Claim. (Cl. 301—41)

This invention relates to non-skid devices for pneumatically tired wheels of automobiles and other mobile devices. More particularly the invention pertains to improvements in means for increasing the traction of rubber tired wheels generally and the means for quickly and easily mounting and dismounting such means.

It is an object of the invention to provide a simple, unitary device for this purpose which is inexpensive to manufacture, efficient in use and convenient to handle. Being unitary in construction it is simply necessary to jack up the car, slip the device over the tire tread, and bolt in place. The device is just as easily removed and same may be conveniently stored in a small space when not in use.

Further objects and the advantages and the special features of my invention will be recognized as the specification is read in conjunction with the drawings which form a part thereof and in which:

Figure 1 is a side elevation of an automobile wheel upon which is attached my anti-skid device.

Figure 2 is a top view of Fig. 1.

Figure 3 is a section of a portion of a tire showing an anti-skid element in position upon the tire tread.

Figure 4 is a section of a portion of a tire showing the anti-skid means which connects with the anti-skid elements.

Fig. 5 is a fragmentary side elevation on an enlarged scale.

In the drawings 5 is the pneumatic tire of an automobile wheel. Attached to the face of the wheel, by the bolts 6 and nuts 7, a metallic disc 8 is provided with a plurality of equally spaced arms 9 which terminate in a substantially right-angle bend 10 to form a portion adapted to rest upon the tire tread 11, said bent portion having upwardly projecting parts or plates 12 and 13 formed therefrom and positioned across the centerline of the tread. Preferably, each of the upwardly projecting parts 12 and 13 is provided, at the lower portion thereof, with slots 14 and 15. These slots are engaged by the upwardly bent end portions 19 and 20 of the connecting member 16 positioned between each of the anti-skid elements carried by the arms 9. These members 16 are adapted to rest upon and flex with the tread of the tire and may, as shown, be composed of a single strip of metal having spaced, upwardly projecting ears 17 and 18 for the purpose of increasing traction. A purpose of the members 16 is to provide flexibility corresponding with the tread surface and to reinforce the complete structure by preventing displacement of the arms 9 due to rotational strain and torque about the axis center 19 of the wheel.

From the above it will be seen that I provide a simple and effective anti-skid device which is suitable for use in snow, ice and mud, some of the elements of which are effective laterally and some longitudinally to meet varying operating conditions. It will be understood that while I have illustrated and described a preferred embodiment of my invention departures may be made in structure and materials without departing from the spirit of the invention as set forth in the claim.

I claim as my invention:

In a non-skid device for an automobile tire, a metal disk of smaller diameter than that of the tire adapted for mounting upon one side of the wheel bearing said tire and having a series of peripheral arms extending therefrom up to and over one side of the tread of said tire, a pair of transverse outwardly projecting plates fixed upon the opposite edges of the end of each arm across the tread, and elongated flexible elements upon said tread interconnecting each pair of respectively adjacent arms adjacent said transverse plates and having outwardly projecting opposite pairs of ears transversely spaced apart.

References Cited in the file of this patent

UNITED STATES PATENTS

| 1,504,649 | Smith | Aug. 12, 1924 |
| 1,627,768 | Crews | May 10, 1927 |
| 1,787,608 | Ansell | Jan. 6, 1931 |
| 1,890,346 | Tudhope | Dec. 6, 1932 |
| 1,949,922 | Simon et al. | Mar. 6, 1934 |
| 2,063,535 | Aloe | Dec. 8, 1936 |
| 2,083,367 | Fuller | June 8, 1937 |
| 2,178,592 | Lincoln | Nov. 7, 1939 |
| 2,372,049 | Bailey | Mar. 20, 1945 |